United States Patent [19]

Tobin

[11] Patent Number: 4,555,275
[45] Date of Patent: Nov. 26, 1985

[54] HYDROGEN PERMEATION PROTECTION FOR METALS

[75] Inventor: Albert G. Tobin, Hauppauge, N.Y.

[73] Assignee: Grumman Aerospace Corporation, Bethpage, N.Y.

[21] Appl. No.: 662,736

[22] Filed: Oct. 19, 1984

[51] Int. Cl.$^4$ .............................................. C23F 7/02
[52] U.S. Cl. ................................... 148/6.3; 148/6.35; 427/248.1; 376/305
[58] Field of Search ................... 148/6, 6.35, 6.3; 376/305; 428/629, 662; 427/383.9, 248.1

[56] References Cited

U.S. PATENT DOCUMENTS

| | | | |
|---|---|---|---|
| 2,863,818 | 12/1958 | Smith et al. | 204/193.2 |
| 2,886,431 | 5/1959 | Smith et al. | 75/134 |
| 3,031,392 | 4/1962 | Ida et al. | 204/193.2 |
| 3,060,557 | 10/1962 | Rostoker et al. | 29/194 |
| 3,301,668 | 1/1967 | Cope | 75/123 |
| 3,359,176 | 12/1919 | Antil | 525/329.3 |
| 3,576,621 | 4/1971 | Keith et al. | 75/134 |
| 3,677,723 | 7/1972 | Borgstedt et al. | 29/194 |
| 3,719,519 | 3/1973 | Perugini | 75/239 |
| 4,157,923 | 6/1979 | Yen | 427/383.9 |
| 4,224,382 | 9/1980 | Brown et al. | 428/656 |
| 4,297,246 | 10/1981 | Cairns et al. | 252/465 |

FOREIGN PATENT DOCUMENTS 0870496 10/1981 U.S.S.R. .

*Primary Examiner*—Sam Silverberg
*Attorney, Agent, or Firm*—Pollock, Vande Sande & Priddy

[57] ABSTRACT

A method is proposed to attenuate hydrogen diffusion through fusion reactor components via controlled oxidation of prealloyed surfaces. Alloys of zirconium, vanadium, titanium, niobium, tantalum, tungsten, nickel and iron may be protected from hydrogen isotope permeation by using vanadium as an intermediate layer and either chromium, nickel-chromium, silicon or aluminum as the oxide forming component. This method may also be used to prevent hydrogen embrittlement of metals from external hydrogen environments and is applicable to the majority of alloy systems exhibiting hydrogen embrittlement phenomena.

7 Claims, 5 Drawing Figures

HYDROGEN PERMEATION PROTECTION FOR METALS

FIELD OF THE INVENTION

The present invention relates to fusion reactors and more particularly to a hydrogen isotope permeation barrier for fusion reactor components such as a first wall.

BACKGROUND OF THE INVENTION

In fusion reactors hydrogen isotope permeation through fusion reactor components, such as first walls and limiters, pose serious recovery and environmental problems due to radioactivity. Any permeation barrier for the first wall must be with coolants such as helium, water or liquid metals. One of the most attractive compatible means of reducing permeation is to introduce a permeation barrier in the form of a coating on one side of the component that does not face the hydrogen source. Oxide materials are extremely attractive for this application since they have the lowest known permeabilities for hydrogen. However, application of an oxide coating to the metallic substrate is limited by the thermal, mechanical and metallurgical incompatibilities between the phases being joined. In general, the bonding and mismatch in expansion between the oxide and metal severly limit the choice of materials. In addition, variations in coating uniformity, porosity, flaw distribution, etc., create serious coating reliability problems, especially if complex geometries are to be protected. Finally, such coatings are not self healing and could create serious hydrogen leakage problems in the case of coating failure.

BRIEF DESCRIPTION OF THE INVENTION

The present invention overcomes all of these objections to oxide coating barriers by growing the oxide coating directly on the metal via direct oxidation of the surface. Thus, a stable, adherent, continuous oxide layer of known thickness can be generated on a component of virtually any size or shape. Such an oxide is usually free of the flaws and defects known to cause serious reliability problems associated with external application of oxide layers.

For example, vanadium alloys are attractive materials for both the first wall and blanket of a fusion reactor; however, they are extremely permeable to hydrogen isotopes and would cause unacceptably high losses of tritium through the wall into the coolant stream. This loss can be attenuated significantly by growing a $Cr_2O_3$, $Al_2O_3$, or $SiO_2$ or $NiCr_2O_4$ layer on the vanadium alloy surface via surface oxidation. This is accomplished by depositing either a Si, Cr, Al or Ni-Cr coating onto the vanadium alloy surface and partially diffusing the Si, Cr or Al into the alloy substrate. These elements have a partial-to-total solubility in the vanadium, and will alloy directly with the surface to form a layer of graded composition which is enriched in Si, Al, Cr or NiCr. The surface is subsequently oxidized to create the $SiO_2$, $Cr_2O_3$ or $NiCr_2O_4$ oxide permeation barrier. The thickness of the layer can be carefully controlled by the oxidizing conditions selected. Typically a 0.5–2 $\mu m$ oxide layer can be grown which will be quite effective in attenuating diffusion of hydrogen isotopes.

A second significant application of the invention is that this method can also be employed to protect structural metals which are subject to external hydrogen embrittlement. Alloys which could be protected from hydrogen embrittlement include: steels, zirconium, nickel alloy, niobium, tantalum, molybdenum, tungsten and titanium. Protection can be achieved by deposition of a layer of vanadium as an intermediate layer followed by deposition of the chromium, silicon, Ni-Cr or aluminum layer followed by subsequent diffusion anneal and controlled oxidation of the surface.

In summary, the present invention offers a method to attenuate hydrogen diffusion through fusion reactor components via controlled oxidation of prealloyed surfaces. Alloys of zirconium, vanadium, titanium, niobium, tantalum, tungsten, nickel and iron may be protected from hydrogen isotope permeation by using vanadium as an intermediate layer and either chromium, nickel-chromium, silicon or aluminum as the oxide forming component. Further, this method may also be used to prevent hydrogen embrittlement of metals from external hydrogen environments and is applicable to the majority of alloy systems exhibiting hydrogen embrittlement phenomena.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
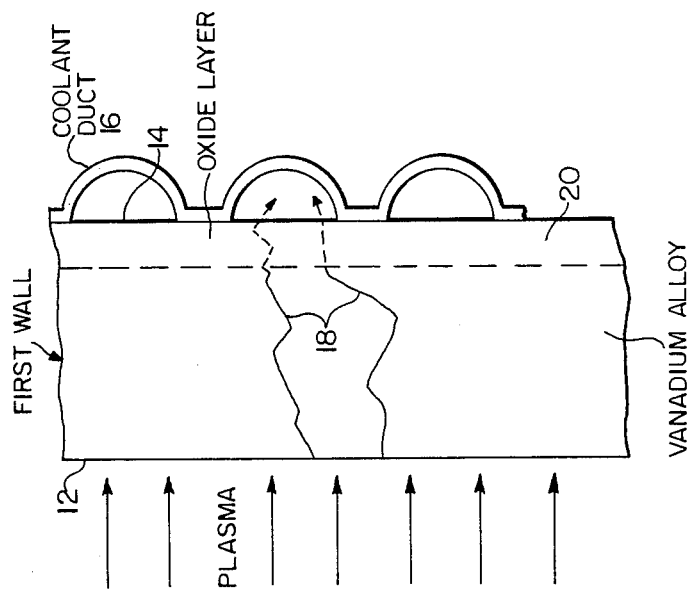
FIG. 1 is a diagrammatic cross section of a fusion reactor first wall as treated in accordance with the method of the present invention.

FIG. 1 illustrates a diagrammatic cross section of a fusion reactor first wall 10 having a first surface 12 confronting the plasma-generating center of a reactor. A coolant duct 16 is connected to an opposite surface 14 of the first wall 10 and, in conventional fashion, coolant is conducted therethrough for retaining the fusion reactor at a safe operating temperature. Typically, coolants may include helium, water or liquid metals. In the design of any permeation barrier on surface 14, compatibility of the barrier material must exist with the coolant.

Paths 18 are intended to indicate typical paths for permeating hydrogen. Radioactive hydrogen isotopes, such as tritium are of particular concern to environmental safety which necessitates costly recovery schemes. Further, permeation of hydrogen isotopes results in a loss of nuclear fuel and the attendant expenses in fuel replacement.

In order to minimize the permeation of hydrogen isotopes into the coolant, an oxide layer 20 is formed inwardly from surface 14 of the first wall.

As disclosed in my co-pending patent application Ser. No. 638,926, filled Aug. 9, 1984, vanadium alloys are attractive materials for both the first wall and the blanket of a fusion reactor. However, such vanadium alloys by themselves are extremely permeable to hydrogen, including radioactive hydrogen isotopes, and would cause unacceptably high losses of tritium through the wall into the coolant stream. By virtue of the present invention, this loss can be attenuated significantly by growing a $Cr_2O_3$, $Al_2O_3$, $SiO_2$ or $NiCr_2O_4$ layer on the vanadium alloy surface via surface oxidation. This is accomplished by depositing either a Si, Cr, Al or Ni-Cr coating onto the vanadium alloy surface and partially diffusing the Si, Cr or Al into the alloy substrate. These elements have a partial to total solubility in the vanadium, and will alloy directly with the surface to form a layer of graded composition which is enriched in Si, Al, Cr or NiCr. The surface is subsequently oxidized to create a $SiO_2$, $Cr_2O_3$ or $NiCr_2O_4$ oxide permeation barrier. The thickness of the layer can be carefully controlled by the oxidizing conditions selected. Typically a 0.5–2 μm oxide layer can be grown which will be quite effective in attenuating diffusion of hydrogen isotopes.

Figure 4:
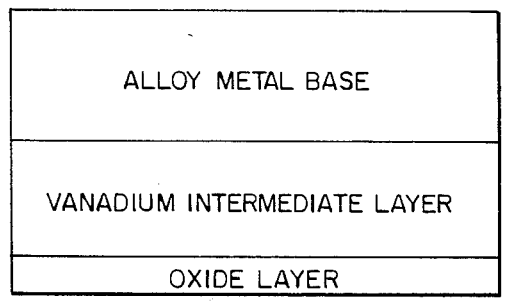
FIG. 4 is a diagrammatic cross sectional view of a layered material, in accordance with the invention, which minimizes hydrogen embrittlement of an alloy metal.

It is to be noted that first wall 10 may be comprised of a solid metal structure such as vanadium or the method may apply to the formation of a permeation barrier on other prealloyed surfaces. Alloys of zirconium, vanadium, titanium, niobium, tantalum, tungsten, nickel and iron may be protected from hydrogen isotope permeation by using vanadium as an intermediate layer and either chromium, nickel-chromium, silicon or aluminum as the oxide forming component. This utilization of vanadium as an intermediate layer is illustrated in FIG. 4.

In consideration of the fusion reactor applications, the present invention:

eliminates the need for a tritium barrier coating with corresponding adhesion problems;

the oxide barrier of the invention becomes integral with the bulk alloy;

there is no limit to the size and shape or parts that may be protected; and oxidation in air is sufficient to create the barrier.

Figure 3:
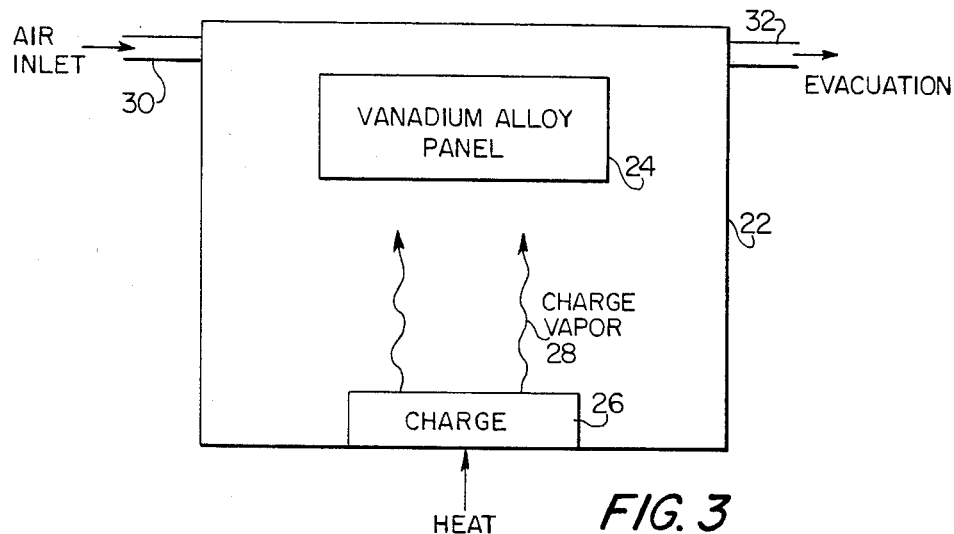
FIG. 3 is a diagrammatic representation of apparatus for achieving the method of the present invention.

FIG. 3 illustrates a simplified view of a setup for treating vanadium alloyed first wall to reduce hydrogen isotope permeation therethrough. As will be seen from the figure, vessel 22 is evacuated through outlet 32. The vessel has vanadium alloy panel 24 suspended therein. A charge 26 is also included within the vessel 22 and is heated. The charge may be Si, Cr, Al or Ni-Cr. If, for example, chromium is the charge, its vapors 28 evaporate and diffuse into the substrate material of panel 24 forming a corresponding chromium diffused layer. It is to be emphasized that other conventional methods may be used for diffusing the chromium into the vanadium alloy substrate. For example, the chromium might be deposited onto the surface of the substrate by conventional means (i.e., sputtering) and subsequently heated to effect diffusion of the chromium into the substrate metal. After the diffusion has been completed, air inlet 30 is opened thereby ending the evacuated condition of the vessel. Upon the application of controlled heat for a controlled period of time, the desired oxidation of the diffused layer will occur thereby successfully completing the treatment of the alloy panel 24. Typically a 0.5–2 μm oxide layer can be grown which will be quite effective in attenuating diffusion of hydrogen isotopes.

Figure 5:
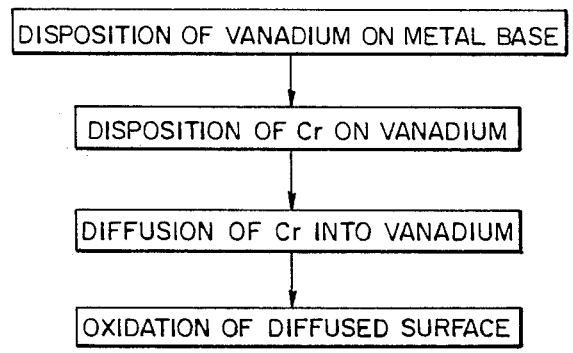
FIG. 5 is a flow chart of the process for fabricating the layered structure in FIG. 4.

The utilization of vanadium as an intermediate layer, as shown in FIG. 4, extends the present invention to another application, namely, the treatment of metal alloys to prevent hydrogen embrittlement. Many industrial materials are subject to an environment in which hydrogen can play a deleterious role in the physical and mechanical properties of the material. The present method can also be employed to protect structural metals which are subject to external hydrogen embrittlement. Alloys which could be protected from hydrogen embrittlement include: steels, zirconium, nickel alloy, niobium, tantalum, molybdenum, tungsten and titanium. Protection can be achieved by the process indicated in FIG. 5. The first step involves the deposition of a layer of vanadium as an intermediate layer. This is followed by deposition of the chromium, silicon, Ni-Cr or aluminum layer followed by subsequent diffusion anneal and controlled oxidation of the surface. Thus, the invention may also be used to prevent hydrogen embrittlement of metals from external hydrogen environments and is applicable to the majority of alloy systems exhibiting hydrogen embrittlement phenomena.

Figure 2:
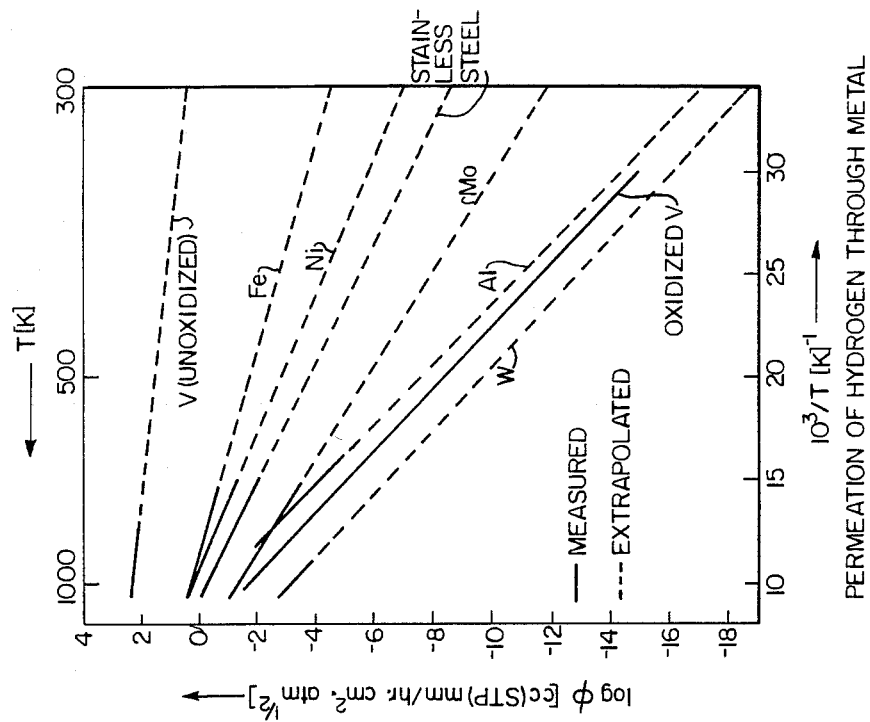
FIG. 2 is a plot of hydrogen permeation through various metals.

FIG. 2 shows a family of plots demonstrating minimization of hydrogen permeation through various metals when the present invention is utilized. For example, the performance of oxidized vanadium is far superior to that of unoxidized vanadium, a host of other metal elements, and even stainless steel.

It should be understood that the invention is not limited to the exact details of construction shown and described herein for obvious modifications will occur to persons skilled in the art.

I claim:

1. A method for reducing hydrogen permeation of a vanadium metal member, the method comprising the steps:

diffusing a metal into one surface of the member to form a diffusion gradient with respect to the surface, the metal selected from the group including Cr, Al, Si or NiCr; and oxidizing the diffused metal.

2. The method set forth in claim 1 wherein the member is comprised of a vanadium alloy and serves as a first wall of a fusion reactor.

3. The method set forth in claim 1 wherein the member is comprised of an alloy metal base upon which vanadium is first deposited as an intermediate layer, and wherein the method reduces hydrogen embrittlement of the base.

4. A method for reducing hydrogen permeation of a vanadium metal member, the method comprising the steps:

positioning the member in confronting relation to a charge having a metal selected from the group including Cr, Al, or Si or NiCr;

heating the charge to form vapor;

subjecting the member to the vapors for a period of time sufficient for the charge metal to diffuse into a confronting surface of the member thus creating a surface layer and corresponding gradient of the charge metal through the member; and oxidizing the diffused charge metal.

5. A method for reducing hydrogen permeation of a vanadium member, the method comprising the steps:

coating at least one preselected surface of the member with a metal selected from the group including Cr, Al, or Si or NiCr;

heating the coated metal until the coating diffuses into the member surface thus creating a gradient of the metal through the member; and oxidizing the diffused charge metal.

6. The method set forth in claim 5 wherein the member is comprised of a vanadium alloy and serves as a first wall of a fusion reactor.

7. The method set forth in claim 5 wherein the member is comprised of a vanadium alloy and serves as a first wall of a fusion reactor.

* * * * *